United States Patent Office 3,794,529
Patented Feb. 26, 1974

3,794,529
METHOD OF MAKING A METAL LAMINATE
Donald R. Thompson, Akron, Ohio, assignor to The Goodyear Tire & Rubber Company, Akron, Ohio
No Drawing. Filed Dec. 15, 1971, Ser. No. 208,479
Int. Cl. C23f 7/08
U.S. Cl. 148—6.15 R                    5 Claims

ABSTRACT OF THE DISCLOSURE

A method of preparing a metal polyurethane laminate by phosphetizing the metal, drying the metal to a water free surface and applying a coating of a soybean alkyd paint or a modified linseed alkyd paint, baking at 225–375° F. until tack-free and applying a polyurethane reaction mixture, and solidifying the said mixture to give a laminate.

---

This invention relates to a method of obtaining an improved bond between metal and a polyurethane and to the resulting laminate. More particularly, this invention relates to a method of obtaining an improved bond between a metal wheel and a microcellular polyurethane and to said laminate.

Polyurethane metal laminates have been used commercially relatively extensively, for example, in the solid polyurethane tire mounted on a hub and other related usages. Experience with metal polyurethane laminates has indicated that it was necessary to use a special surface preparation and treatment of the metal with special additives to obtain a satisfactory bond between the polyurethane and the metal. For instance, it has been customary to apply an organic polyisocyanate or an epoxy material to the metal to achieve a satisfactory bond or tie coat between the metal and the polyurethane. A number of products are available commercially for achieving these results. The use of these special additives in the manufacture of wheels and other laminates introduces a number of extra operations and thus increases the costs associated with the manufacture of these metal laminates.

Therefore, it is an object of this invention to provide a special primer coating on the metal to perform the normal function of protecting the metal from corrosion and yet give the enhanced bond strength between the metal and the polyurethane. This prime coating preferably is applied over the metal after it has been subjected to the usual phosphoretizing treatment generally by either the Parkerizing or Bonderizing methods and thus allow the primer coated metal to be stored indoors or outdoors to await the application of the polyurethane coating or lamina to the metal.

The method of this invention generally comprises cleaning the metal, preferably subjecting it to a phosphoretizing treatment to give a dry metal containing a thin coating of a metal phosphate such as zinc or ferrous phosphate and then applying a primer coating of a soybean alkyd or modified linseed alkyd paint over the metal phosphate coating and baking to dry, preferably tack free, and set the primer coat. Then when it is desired to apply a polyurethane coating to the metal containing the primer coating the metal is water washed and dried, preferably to a water free surface, at a temperature of at least 140° F. and no higher than 180° F., and then the dry metal is placed in a suitable mold or retainer to receive a charge or coating of a suitable polyurethane reaction mixture and allowed to react to yield a polyurethane layer on the metal. Where the polyurethane coating has been in contact with a mold release agent, it is desirable to remove the mold release agent with a suitable solvent and then in most instances dry before applying about 1.5 mils of a coating of protective or decorative paint and then subjecting the painted laminate to a bake treatment whereby the surface is at approximately 235° F. for 20 minutes.

The nature of this invention may be more fully illuminated and illustrated in the following representative and illustrious examples wherein all parts are by weight unless otherwise specified.

Metal plates 4″ x 6″ x .040″ were obtained from Motor Wheel Corporation, Lansing, Mich. These plates had been cleaned by subjecting to a dilute acid wash and then phosphetized by treatment according to the Bonderizing method in a dilute solution of zinc phosphate in dilute phosphoric acid. These Bonderized metal plates were water washed, dried and painted before being subjected to a bake treatment at a temperature of about 310° F. for 20 minutes and allowed to stand for several days to give them time to pick up sufficient contamination analagous to that that would be obtained in storage or shipping of such metal plates. Then the metal plates were subjected to a water wash and dried at a temperature of 175° F. for 20 minutes, then to each of the samples there was applied sufficient reactive polyurethane of the microcellular type to give a half inch coating on the metal plate and cured at a temperature of 100 to 110° F. for about 15 minutes. Each metal speciman was cut into a sample 1″ x 6″ and thus three samples were obtained from each metal speciman. Each of the samples were then subjected to the Goodyear Research Test 31 for strip adhesion. The results of these tests are shown in Table 1.

TABLE 1

| Specimen | Prime paint | Adhesive | Mold temp., °F. | Urethane temp., °F. | Mold post cure, min. | Average peel strength, lbs./inch | Remarks |
|---|---|---|---|---|---|---|---|
| A | None | None | 140-145 | 100-110 | 15 | (¹) | Bond strength was so low that separation occurred while cutting specimens. |
| B | do | Conap ² 1146C | 140-145 | 100-110 | 15 | 17 | Separation between adhesive and metal. |
| C | Gray paint | None | 140-145 | 100-110 | 15 | 17 | Separation between paint and urethane. |
| D | Black paint | do | 140-145 | 100-110 | 15 | 10 | Separation between paint and metal. |
| E | Gray paint | Conap ² 1146C | 140-145 | 100-110 | 15 | (¹) | Bond strength so low that separation occurred while cutting specimens. |
| F | Black paint | do | 140-145 | 100-110 | 15 | 9.0 | Separation between paint and metal. |

¹ No test.
² A commercial tradename for polyarylmethane polyisocyanate type adhesive widely used to give enhanced bonding between polyurethane and metal- The gray paint used in the above test was a commercial soybean alkyl of the short type. The black paint used in the above test was a commercial alkyl paint of the short type.

The polyurethane reaction mixture was a mixture at the ratio of 2.36 to 1 of a premix of 100 parts of acrylonitrile graft polypropylene ether diol of 600–1000 molecular weight, 0.40 part triethylene diamine, 0.70 part dibutyltin dilaurate, 3.65 parts Harwick Standard pigment XL052 with a prepolymer of 65/35 toluene diisocyanate with a mixture of monomeric diol and triol.

The results of these tests indicate the adhesion between the polyurethane and zinc phosphate coated metal using a short soybean alkyd paint containing an inorganic pigment such as barium sulfate, titanium oxide, zinc chromate and amorphous silicon dioxide, was as good as that obtained using the commercial Conap adhesive and this treatment permitted the metal to be given a primer coating to protect it from rusting prior to application of the polyurethane laminate.

The alkyd paints are a well-known class of paints and are generally considered broadly to be the reaction product of a polybasic acid, a polyhydric alcohol and a monobasic fatty acid or oil, dispersed or dissolved in a solvent and containing suitable pigments and driers. The soybean alkyds are considered to be the reaction product of phthalic acid or anhydride, glycerol, and soybean oil. In the modified linseed alkyds the soybean oil is replaced with linseed oil. The alkyds are further classified as short, medium and long oil length alkyds. The short soybean alkyds usually contain about 33–43% by weight of soybean oil and is cured by baking 225 to 375° F., with the preferred temperature being 250 to 325° F. and is dispersed in an aromatic hydrocarbon solvent such as xylene, toluene, benzene and their mixtures. The medium soybean alkyds contain about 48 to 53% soybean oil and is dispersed in aliphatic to semi-aromatic hydrocarbon solvent such as xylene, toluene, benzene and their mixtures. The medium soybean alkyds contain about 48 to 53% soybean oil and are dispersed in aliphatic to semi-aromatic hydrocarbons such as mineral spirts, VM & P naphtha and aromatic naphtha. The long soybean alkyds usually contain 59 to 74% soybean oil and are dispersed in aliphatic hydrocarbons such as mineral spirits. The modified linseed alkyds are likewise classed as short, medium and long alkyls and those in between are referred to as intermediate short, medium and long alkyds. The alkyd paints usually contain about 40 to 60% of solids. Suitable driers for air drying alkyd paints are cobalt and manganese carboxylic acid salts such as the naphthenic acid salts. The specific nature of alkyd paints, driers, their manufacture and use are described in the Federation Series on Coatings Technology, published in 1969 as Unit Five— Alkyd Resins, and Unit Eleven—Paint Driers and Additives.

In another series of examples, steel plates suitable for stamping out wheel blanks were used for test purposes. The test specimen were prepared on a metal strip ¼" x 1" x 6" by acid pickling in about 10 to 15% sulfuric acid to remove scale, water washed and phosphetized in a Bonderizing bath of dilute phosphoric acid containing zinc phosphate, an oxidizer or accelerator of calcium perchlorate, nitrite or nitrate, washed, chromic acid rinsed and dried in a warm oven at 150–160° F. to give metal having a coating of about 125 to 250 milligrams per square foot of zinc phosphate. A second or third treatment increases the amount of zinc phosphate deposited but the resulting treatments gives a lower strength polyurethane bond, in some instances as much as 10 to 20%. Therefore, it is preferred to use a metal having 150 to 200 milligrams coating of zinc phosphate per square foot. Thus, a strip given a single dip and then painted with a grey short soybean alkyl paint (toluene solvent) gave a polyurethane laminate that had a peel of 75 pounds when tested on an Instron machine using a 90° pull at 2 inches per minute upon separation.

Although this invention has been described with a soybean alkyd paint, it can be replaced with a modified linseed alkyd paint but the adhesion is not as good. Therefore, the short soybean paint to medium soybean paints are preferred, with the short soybean paint being the most preferred.

Any of the liquid polyurethane reaction mixtures can be used with this invention where an excess of an organic polyisocyanate is reacted with the reactive hydrogen containing compounds of about 300 to 10,000 molecular weight from the class of polyester polyols, polyether polyols and hydrocarbon polyols and crosslinking agents of monomeric polyol, polyamines and amino alcohols.

For instance, the foregoing examples having used a microcellular urethane but homogeneous and porous polyurethanes could be used. Representative examples of the isocyanates are toluene diisocyanate, methane diphenyl diisocyanate (MDI), hydrogenated MDI, isophrone diisocyanate and hexylene diisocyanate. Representative examples of reactive hydrogen containing material are polypropylene ether glycol, polytetramethylene ether glycol, adipates and azelates of ethylene, propylene and butylene. Representative monomeric polyols are glycols of 2 to 20 carbonates, corresponding triols of 3 and higher carbon atoms and the polyamines, viz, diamines of 2 to 20 carbon atoms.

Thus, the microcellular coated metal strips afford a method of producing wheels which have a polyurethane coating having enhanced resistance to peel.

While certain representative embodiments and details have been shown for the purpose of illustrating the invention, it will be apparent to those skilled in this art that various changes and modifications may be made therein without departing from the spirit and scope of the invention.

What is claimed is:

1. A method of preparing a metal polyurethane laminate comprising cleaning and phosphatizing the metal, to give a phosphate coating thereon, drying the metal to a water free surface, applying a coating selected from the class consisting of a soybean alkyd paint and a modified linseed alkyd paint over the phosphatized surface, baking at 225° F. to 375° F. until tack free and then applying a polyurethane reaction mixture over the paint coating to build a laminate and solidifying the polyurethane reaction mixture.

2. The method of claim 1 wherein the phosphate coating is about 125 to 250 milligrams per square foot of metal surface.

3. The method of claim 1 wherein a short soybean alkyd paint is used.

4. The method of claim 1 wherein the polyurethane reaction mixture comprises a reactive hydrogen containing material selected from the class of polyether polyols, polyester polyols and hydrocarbon polyols and an excess of organic polyisocyanate and a crosslinking agent selected from the class of monomeric polyols, polyamines and amino alcohols and the reaction mixture is reacted to form a polyurethane.

5. The method of claim 1 wherein the polyurethane reaction mixture comprises 100 parts of acrylonitrile grafted polypropylene ether polyol of 600 to 1000 molecular weight with an excess of toluene diisocyanate and the reaction mixture is reacted to form a polyurethane.

References Cited

UNITED STATES PATENTS

| | | | |
|---|---|---|---|
| 2,636,257 | 4/1953 | Ford | 148—6.15 R |
| 2,782,131 | 2/1957 | Johnson | 117—75 X |
| 2,873,210 | 2/1959 | Barrett et al. | 117—75 |

RALPH S. KENDALL, Primary Examiner

U.S. Cl. X.R.

117—75, 132 B, 161 KP; 148—6.15 Z